(12) United States Patent
Ignatowicz

(10) Patent No.: US 7,758,239 B2
(45) Date of Patent: Jul. 20, 2010

(54) METHOD AND DEVICE FOR NORMALIZING TEMPERATURE VARIATIONS

(75) Inventor: Steven Ignatowicz, Grayslake, IL (US)

(73) Assignee: Fluke Corporation, Everett, WA (US)

( * ) Notice: Subject to any disclaimer, the term of this patent is extended or adjusted under 35 U.S.C. 154(b) by 645 days.

(21) Appl. No.: 11/016,414

(22) Filed: Dec. 17, 2004

(65) Prior Publication Data

US 2005/0111520 A1    May 26, 2005

Related U.S. Application Data

(62) Division of application No. 10/648,469, filed on Aug. 26, 2003, now Pat. No. 6,837,616.

(60) Provisional application No. 60/444,870, filed on Feb. 4, 2003, provisional application No. 60/406,291, filed on Aug. 27, 2002.

(51) Int. Cl.
*G01N 25/72* (2006.01)
*G01N 25/20* (2006.01)
*G01K 1/02* (2006.01)

(52) U.S. Cl. .......... 374/139; 374/5; 374/124; 374/129; 374/57

(58) Field of Classification Search .......... 374/4, 374/45, 57, 121, 137, 139, 1, 2, 129, 5, E13.001, 374/110, 112, 43, 100, 141, 160; 266/274
See application file for complete search history.

(56) References Cited

U.S. PATENT DOCUMENTS

| | | | |
|---|---|---|---|
| 3,101,618 A | 8/1963 | Hance | |
| 4,222,506 A | 9/1980 | Sakashita et al. | |
| 4,310,003 A * | 1/1982 | Schlager | 600/549 |
| 4,343,182 A | 8/1982 | Pompei | |
| 4,367,865 A | 1/1983 | Blair et al. | |
| 4,439,049 A * | 3/1984 | Hoogendoorn et al. | 374/124 |
| 4,502,793 A * | 3/1985 | Smith et al. | 374/124 |
| 4,524,954 A | 6/1985 | Baas et al. | |
| 4,634,294 A * | 1/1987 | Christol et al. | 374/170 |
| 4,733,079 A | 3/1988 | Adams et al. | |
| 4,768,158 A | 8/1988 | Osanai | |
| 4,854,162 A * | 8/1989 | Yerace et al. | 73/119 R |
| 4,854,724 A * | 8/1989 | Adams et al. | 374/5 |
| 4,965,451 A * | 10/1990 | Solter | 250/330 |
| 5,102,231 A * | 4/1992 | Loewenstein et al. | 374/129 |

(Continued)

FOREIGN PATENT DOCUMENTS

JP    6029585    2/1985

(Continued)

OTHER PUBLICATIONS

"Monitoring Lining Wear Through Laser Beam Technology-AGA IMS 1600," Dahlberg et al., 865 Iron and Steel Engineer, vol. 59, Nov. 1982, No. 11, pp. 38-43.

(Continued)

*Primary Examiner*—Gail Verbitsky
(74) *Attorney, Agent, or Firm*—Fredrikson & Byron, P.A.

(57) ABSTRACT

A method of sensing the temperature of a heated object includes obtaining past temperature data relating to the heated object, capturing a thermal image of the heated object, obtaining a reference temperature of the heated object, and calculating a normalized hotspot temperature.

12 Claims, 14 Drawing Sheets

U.S. PATENT DOCUMENTS

| | | | | |
|---|---|---|---|---|
| 5,128,884 | A * | 7/1992 | Prager | 702/99 |
| 5,131,758 | A * | 7/1992 | Heyman et al. | 374/5 |
| 5,185,667 | A | 2/1993 | Zimmermann | |
| 5,331,311 | A | 7/1994 | Doctor | |
| 5,333,784 | A * | 8/1994 | Pompei | 236/91 C |
| 5,563,494 | A * | 10/1996 | Cuesta et al. | 320/150 |
| 5,654,977 | A * | 8/1997 | Morris | 374/4 |
| 5,816,703 | A * | 10/1998 | Yamazaki et al. | 374/4 |
| 5,968,227 | A | 10/1999 | Goldstein et al. | |
| 6,077,228 | A * | 6/2000 | Schonberger | 600/549 |
| 6,196,385 | B1 * | 3/2001 | Thompson et al. | 206/315.6 |
| 6,648,506 | B2 * | 11/2003 | McGrath et al. | 374/161 |
| 6,840,666 | B2 * | 1/2005 | Enachescu et al. | 374/5 |
| 6,840,667 | B2 * | 1/2005 | Schlagheck et al. | 374/5 |
| 7,009,695 | B2 * | 3/2006 | Some | 356/237.1 |
| 2002/0018510 | A1 * | 2/2002 | Murphy et al. | 374/45 |
| 2004/0109415 | A1 * | 6/2004 | Zansky et al. | 370/235 |
| 2005/0086952 | A1 * | 4/2005 | Nonaka et al. | 62/129 |
| 2005/0147150 | A1 * | 7/2005 | Wickersham et al. | 374/120 |
| 2006/0242186 | A1 * | 10/2006 | Hurley | 707/102 |
| 2007/0210255 | A1 * | 9/2007 | Bjorkholm | 250/358.1 |

FOREIGN PATENT DOCUMENTS

| | | |
|---|---|---|
| JP | 60214214 | 10/1985 |
| JP | 6309075 | 4/1988 |
| JP | 01140001 | 6/1989 |
| JP | 10298627 | 10/1998 |

OTHER PUBLICATIONS

"On-Line Monitoring of Torpedo Car Shells," Botelho et al., Proceedings of SPIE, vol. 4360, 2001, pp. 277-284.

"Thermography in he condition Monitoring of Refractory Lining," Kauppinen et al., Part of the SPIE Conference on Thermosense XXI, Apr. 1999, SPIE vol. 3700, pp. 214-226.

International Search Report for International Patent Application No. PCT/US03/26581, dated Feb. 9, 2004, 9 pages.

G. Raymond Peacock; "Thermal Imaging of Liquid Slag in a Pour Stream," Proc. SPIE 4020, pp. 50-60, Mar. 2000.

K. Elliot Cramer and William P. Winfree; "Application of the Thermal Line Scanner to Quantify material Loss Due to Corrosion," Proc. SPIE 4020, pp. 210-219, Mar. 2000.

Christopher A. Sahr; "Thermal Imaging of Railroad Cars Used for Molten Iron Transport," Proc. SPIE Int. Soc. Opt. Eng. 3700, pp. 194-201, Apr. 1999.

Timo T. Kauppinen, Pekka Alamaki, Jarmo Lilja, and Keijo Ruotsalainen; "Thermology in the Condition Monitoring of a Refactory Lining", Proc. SPIE Int. Soc. Opt. Eng. 3700, pp. 214-226, Apr. 1999.

* cited by examiner

METHOD AND DEVICE FOR NORMALIZING TEMPERATURE VARIATIONS

CROSS-REFERENCE TO RELATED APPLICATION

The present application is a divisional application based on, and claiming the priority benefit of, co-pending U.S. application Ser. No. 10/648,469, which was filed on Aug. 26, 2003, which claimed the priority benefit of U.S. provisional application Ser. No. 60/406,291, which was filed on Aug. 27, 2002, and U.S. provisional application Ser. No. 60/444,870, which was filed on Feb. 4, 2003.

FIELD OF THE DISCLOSURE

The disclosure generally relates to a method and device for sensing the temperature on a molten metal vehicle and, more particularly, relates to sensing and normalizing the temperature variations on a molten metal vehicle during the pouring of molten metal from the molten metal vehicle.

BACKGROUND OF THE DISCLOSURE

Rail vehicles that are manufactured to transport molten metal are usually referred to as "torpedo cars" or "ladle cars". These torpedo cars are filled, through an orifice located on the upper part of the car, with molten metal which may reach temperatures in excess of 2000° F. To remove the molten metal, the torpedo car body is rotated to its side, thereby allowing the molten metal to flow through the orifice out of the torpedo car. Eventually, the torpedo car through repeated use or through factors such as poor workmanship or inferior material, will experience a breach of the torpedo car body, thereby allowing the molten metal to spill.

To prevent such a spill from occurring, many foundries have implemented proactive maintenance programs to detect potential points of weakness or thinness on the torpedo body, prior to failure. As part of the maintenance program, foundries traditionally use two thermal scanners or cameras mounted on either side of the torpedo car tracks to capture an image of the underside of the torpedo body as the torpedo car passes by. The resulting image, and more specifically, the resulting hot spots that are revealed by the pair of thermal scanners or cameras are then used to determine if and where the weak or thin areas are located on the torpedo body.

Unfortunately, due to the narrow field of view of the thermal scanners or cameras and due to their limited mounting positions for obtaining an image of the underside of the torpedo car body, certain areas of the underside of the torpedo car body are blocked or missed, creating the possibility of missing thin and weak areas. To obtain a larger field of view, a larger or wider lens or one or more thermal imagers may be used, thereby eliminating or reducing the size of the missed areas on the underside of the torpedo car body. However, the images that are produced by the thermal imagers may be distorted, due to the size of the lens required to obtain the proper field of view. Additionally, a disadvantage to using more than one of the thermal cameras or scanners, or the thermal imagers as described above, is the cost of having to obtain and maintain a pair of thermal cameras, scanners, or imagers.

Furthermore, due to many varying factors such as ambient temperatures, humidity levels, general weather conditions such as rain, snow, and the hotspots that are revealed by the thermal scanners or cameras can vary greatly on the same torpedo car depending on the those same varying factors. The lack of compensation for these varying factors may, therefore, provide for inaccurate temperature measurements.

SUMMARY OF THE DISCLOSURE

In accordance with one aspect of the disclosure, a method of sensing the temperature of a heated object is provided. In one exemplary embodiment, the method includes providing a thermal imager to capture a thermal image of the heated object thereby obtaining at least one of a reference temperature and a hot spot temperature. The method further includes calculating a normalized hotspot temperature from the hotspot temperature, the reference temperature, and from earlier obtained temperature data relating to the heated object.

In accordance with another aspect of the disclosure, a method of sensing the temperature of a molten metal vehicle is provided. The method includes capturing at least one thermal image of the molten metal vehicle using at least one thermal imager and realizing a plurality of pixels from the thermal image. The method further includes replacing distorted pixels from the captured image with non-distorted pixels from a look-up table, thereby obtaining a thermal image representative of the molten metal vehicle.

In accordance with another aspect of the disclosure, a method of sensing the temperature of a molten metal vehicle is provided. In one exemplary embodiment, the method includes providing a thermal imager to capture a thermal image of the molten metal vehicle thereby obtaining at least one of a reference temperature and a hot spot temperature. The method further includes calculating a normalized hotspot temperature from the hotspot temperature, the reference temperature, and from earlier obtained temperature data relating to the molten metal vehicle.

In accordance with another aspect of the disclosure, a system for sensing the temperature of a molten metal vehicle is provided. The system includes at least one thermal imager and a controller that is communicably coupled to the thermal imager. The controller is adapted to receive thermal image data from the thermal imager, and is programmed to identifying an area of dispensing molten metal from the thermal image to determine the rotational position of the molten metal vehicle based on the identified area.

In accordance with another aspect of the disclosure, a system for sensing the temperature of a heated object is provided. The system includes at least one thermal imager and a controller. The controller is communicably coupled to the thermal imager, and is adapted to receive thermal image data from the thermal imager. A memory is communicably coupled to the controller, and stores past heated object temperature data. The controller is programmed to obtain current temperature data from the thermal image, and to calculate a normalized hotspot temperature from the current temperature data, and the past temperature data.

These and other aspects and features of the disclosure will be more readily understood upon reading the following detailed description when taken in conjunction with the accompanying drawings.

Figure 1:
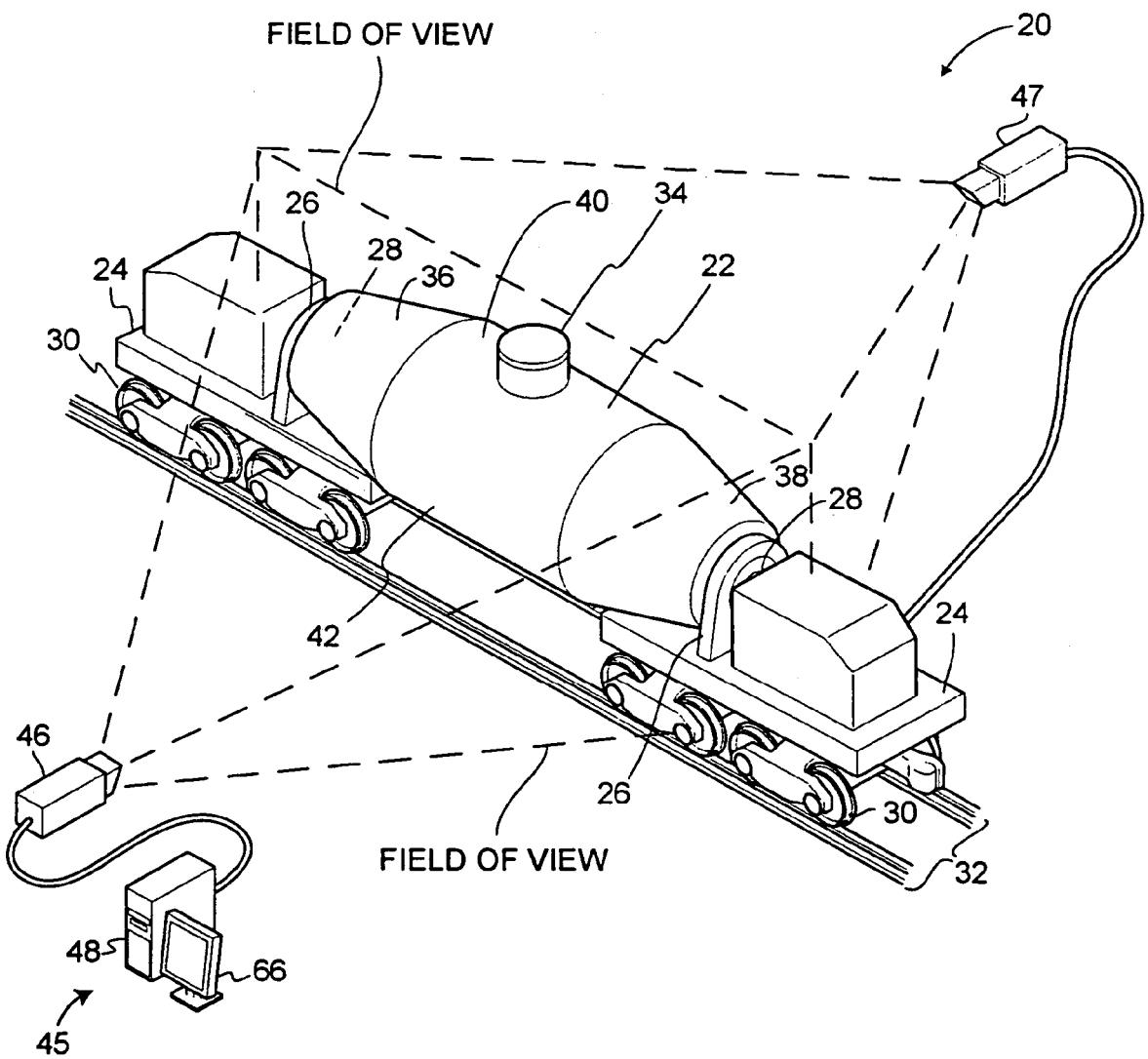
FIG. 1 is an isometric view of one exemplary embodiment of a temperature sensing system as constructed in accordance with the teachings of the disclosure.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

DETAILED DESCRIPTION OF THE DISCLOSURE

Figure 3:
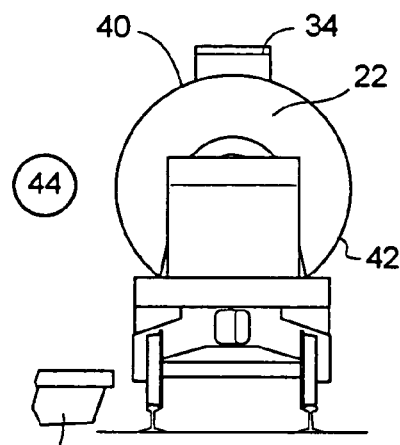
FIG. 3 is an end view of the torpedo car of FIG. 2.
Figure 5:
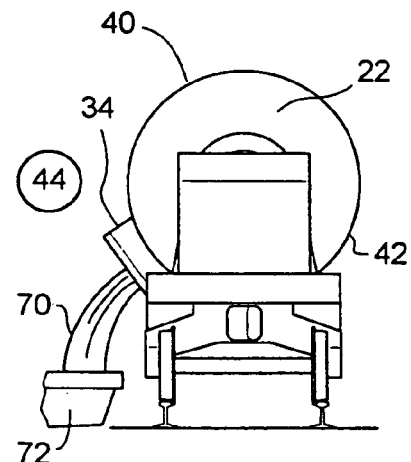
FIG. 5 is an end view of the torpedo car of FIG. 4.

Referring now to the drawings, and with specific reference to FIG. 1, a molten metal vehicle or torpedo car is generally depicted by reference numeral 20. As shown therein, the torpedo car 20 includes a body 22, a chassis 24, a pair of mounting brackets 26, pivot points 28, and wheels 30 that are adapted to travel along tracks 32. The body 22 includes an orifice 34, a first end 36, a second end 38, an upperside 40 and an underside 42. The body 22 is further adapted to pivot about the pivot points 28 located at the first and second ends 36, 38, thereby allowing the orifice 34 located near the upperside 42 of the body 22, to be rotated from a ninety degree position as shown in FIG. 3, to an approximate two-hundred forty degree position as shown in FIG. 5. The side to which the orifice 34 rotates is the pour side 44.

In one exemplary embodiment as depicted FIG. 1, a thermal imaging system 45 may include a thermal imager 46, thermal imaging software and a controller 48. The controller 48, which may be adapted to receive the signals generated by a torpedo car sensor 50 (FIG. 11) and the thermal imager 46, may also be adapted to transmit signals. The controller 48 may, for example, include a transceiver able to receive and/or transmit signals via a wireless or wire technology. More specifically, the signals generated by the torpedo car sensor 50 and/or the thermal imager 46 may be transmitted to the controller 48 via a hardwire such as RS485 or telephone technology, or via wireless technology, such as RF radio or Cellular Digital Packet Data (CDPD), or the like. Similarly, the method of transmitting a signal from the controller 48, may be accomplished via any of the above-mentioned or other ways readily recognized by those of ordinary skill in the art.

Figure 11:
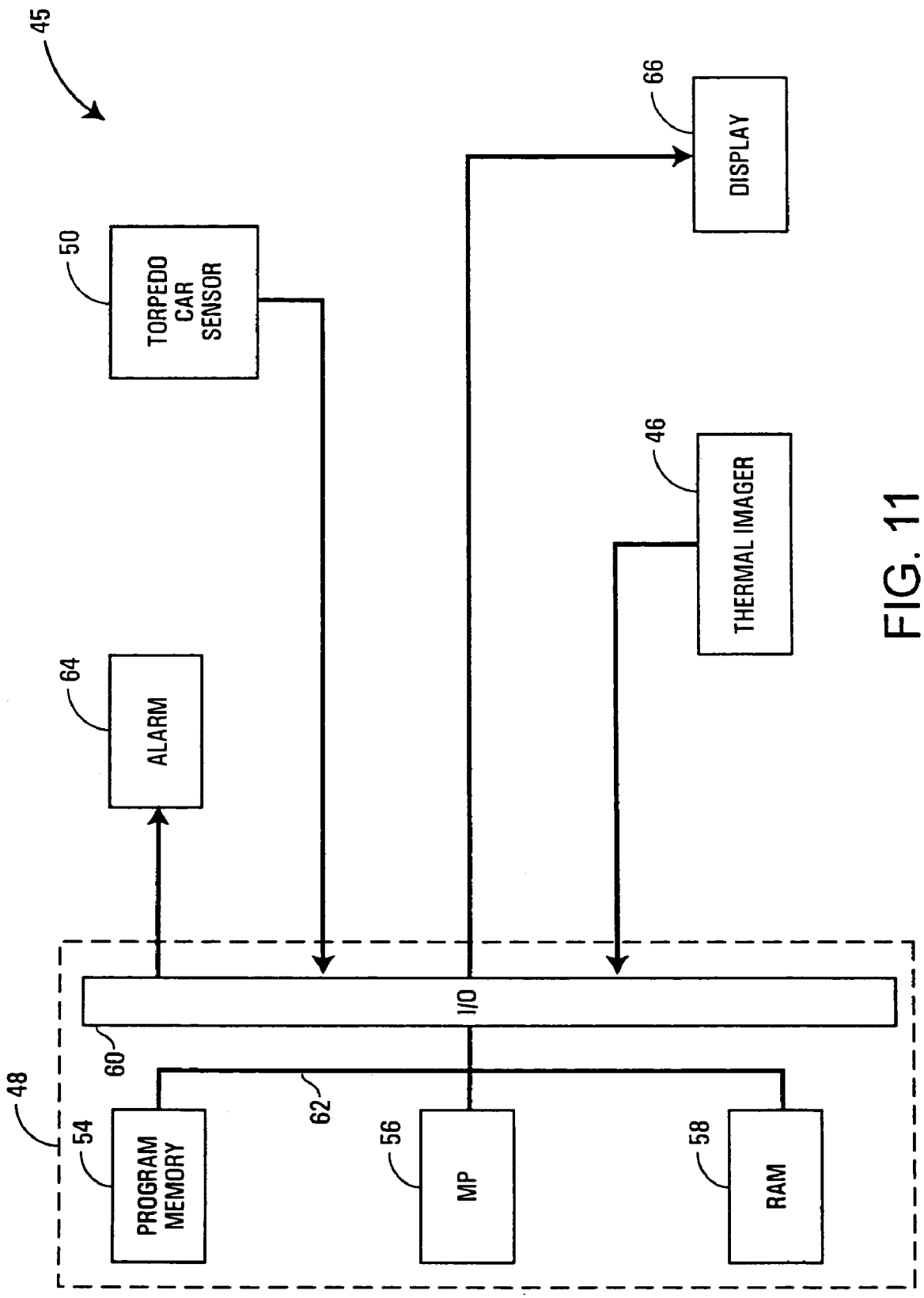
FIG. 11 is a block diagram of the electronic components of the thermal imaging system.

More specifically, as shown in the block diagram of FIG. 11, a number of components may comprise the controller 48. The controller 48 in one exemplary embodiment may include a program memory 54, a microcontroller or microprocessor (MP) 56, a random-access memory (RAM) 58 and an input/output (I/O) circuit 60, all of which may be interconnected via an address/data bus 62. It should be appreciated that although only one microprocessor 56 is shown, the controller 48 may include additional microprocessors. Similarly, the memory of the controller 48 may include multiple RAMs 58 and multiple program memories 54. Although the I/O circuit 60 is shown as a single block, it should be appreciated that the I/O circuit 60 may include a number of different types of I/O circuits. The RAM(s) 58 and program memories 54 may be implemented, for example, as semiconductor memories, magnetically readable memories, and/or optically readable memories or other memories recognized by those of ordinary skill in the art.

FIG. 11 illustrates that the torpedo car sensor 50 and the thermal imager 46, may be operatively coupled to the I/O circuit 60. Each of the above components may be so coupled by a unidirectional or bidirectional, single-line or multiple-line data link, which may depend on the design of the component that is used.

Components may be connected to the I/O circuit 60 via a direct line or conductor. Different connection schemes could be used. For example, one or more of the components shown in FIG. 2 may be connected to the I/O circuit 60 via a common bus or other data link that is shared by a number of components. Furthermore, those of ordinary skill in the art will recognize that some of the components may be directly connected to the microprocessor 56 without passing through the I/O circuit 60.

The output of the controller 48 may be connected to one or more components, including but not limited to, an alarm 64 and a display 66 adapted to receive and/or respond to a signal generated by the controller 48. The means by which the signal is transmitted can, once again, vary greatly and may be similar or equal to the means by which the input signal was received.

In operation, (as shown in a comparison between FIGS. 2 and 4) the already filled torpedo cars 20 will pour, at a specific location such as a pour location, a molten metal 70 content into a chute or container 72. Located at the pour location is the thermal imager 46 mounted and located in a manner allowing the imager 46 to obtain, during the pouring of the molten metal 70, an unobstructed view of the side opposite the pour side 44 of the torpedo cars 20.

Figure 10:
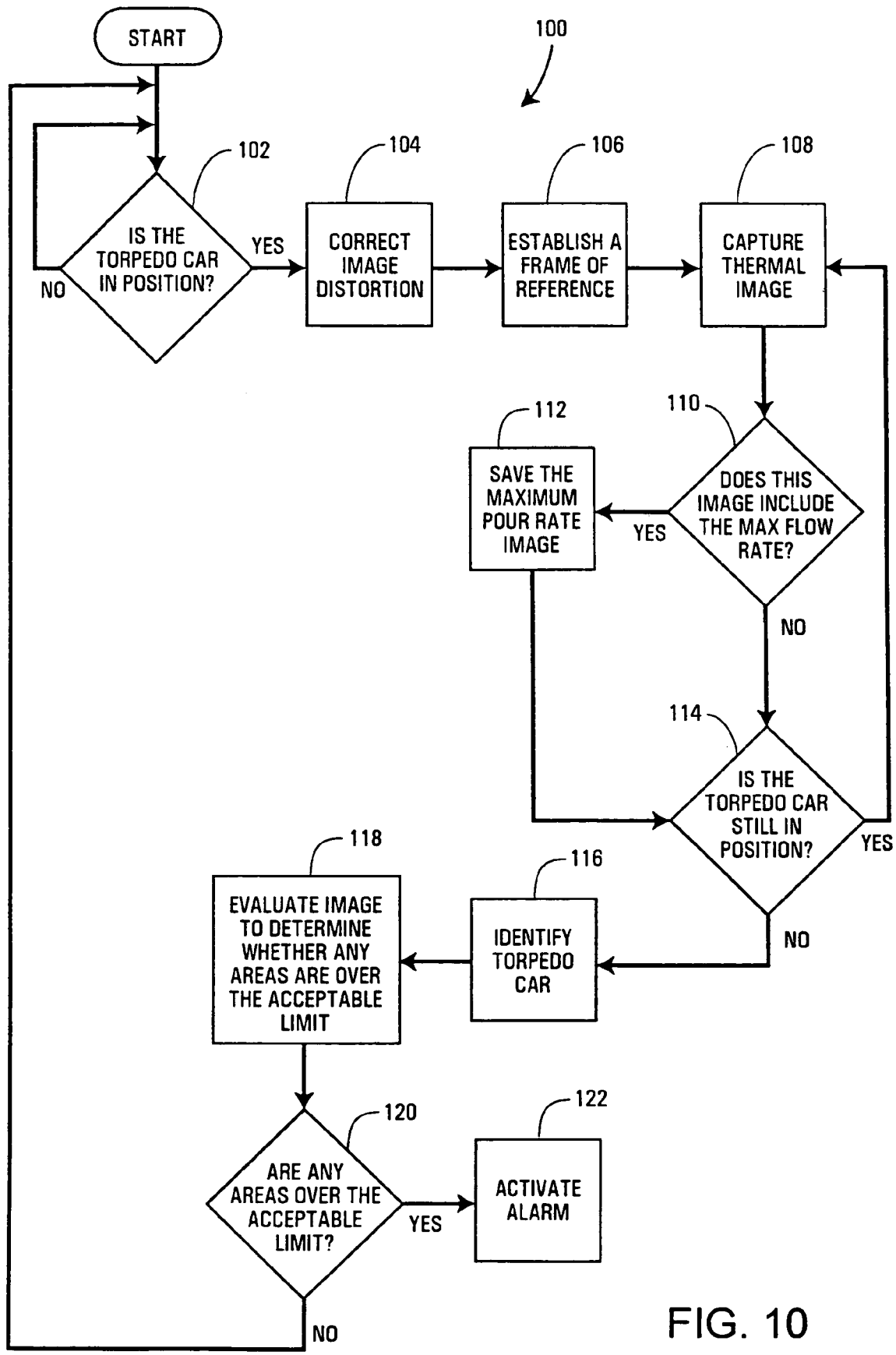
FIG. 10 is an exemplary routine that may be performed during the operation of the temperature sensing of the torpedo car.

One embodiment of this operation is depicted graphically in an exemplary routine 100, provided in FIG. 10. Once the torpedo car 20 comes to a stop at the pour location, the thermal imager 46 may begin capturing images. At a block 102, the thermal imaging system 45 may determine whether the torpedo car 20 has come to a halt. The thermal imaging system 45 may know that the torpedo car 20 has come to a stop by a signal received from the torpedo car sensor 50 indicating that the torpedo car 20 has stopped. In an alternate exemplary embodiment, the thermal imaging system 45 may determine whether the torpedo car 20 has come to a stop, by programming the thermal imaging system 45 to respond to a percentage of the field of view of the thermal image.

For example, the thermal imager 46 may have a field of view as can be seen in FIG. 1. As the torpedo car 20 comes into view of the thermal imager 46, a percentage of the field of view will be occupied by the torpedo car 20, a percentage will be ambient surroundings, and a percentage may be miscellaneous objects. The thermal imaging system 45 may be programmed to consider the torpedo car 20 stopped when the percentage of the field occupied by the torpedo car 20 reaches above a predetermined number. More specifically, when more than fifty percent of the thermal image is occupied by a temperature in the range of two hundred to three hundred degrees Fahrenheit (a temperature range that may be representative of the torpedo car 20) the thermal imaging system 45 may consider the torpedo car 20 to be stopped.

It should be noted at this point that the routine 100 is only one of many possible routines for sensing the temperature variations on the torpedo car 20 during the pouring of the molten metal 70 from the torpedo car 20, and that it is not the intention of the applicant to limit this disclosure to the routine 100. Furthermore, other routines may involve more or less hardware, software and/or steps than are disclosed in the routine 100.

Figure 12:
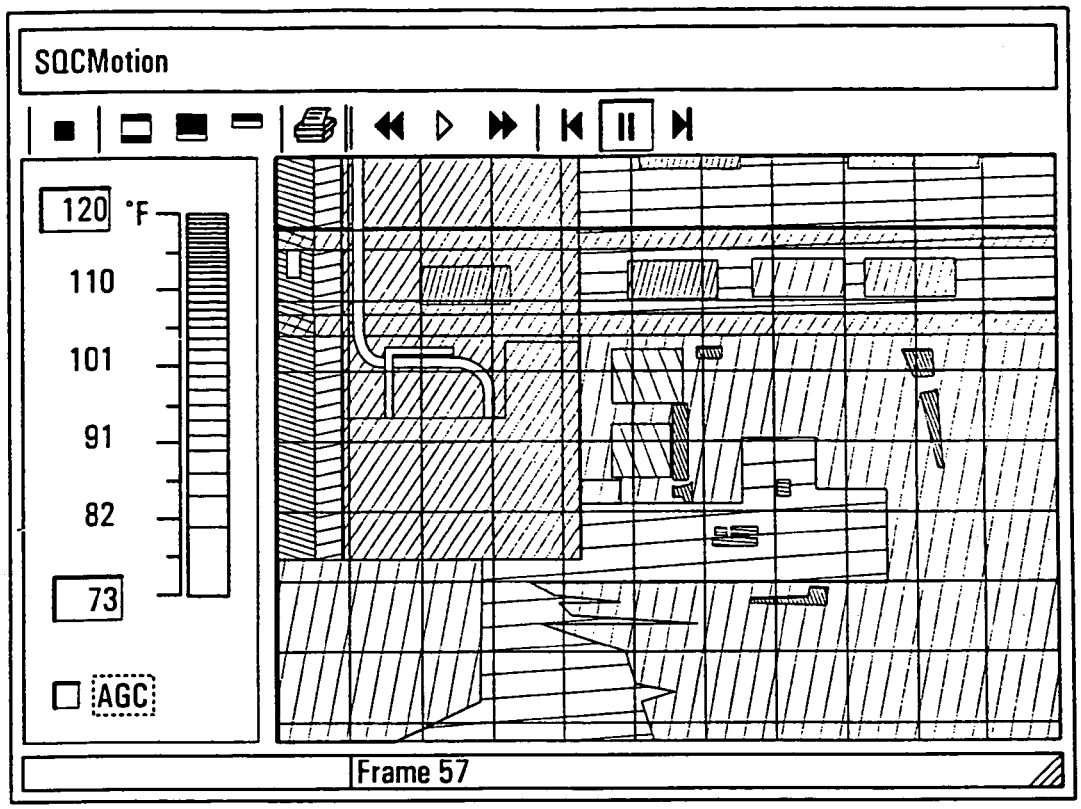
FIG. 12 is a corrected thermal image.
Figure 13:
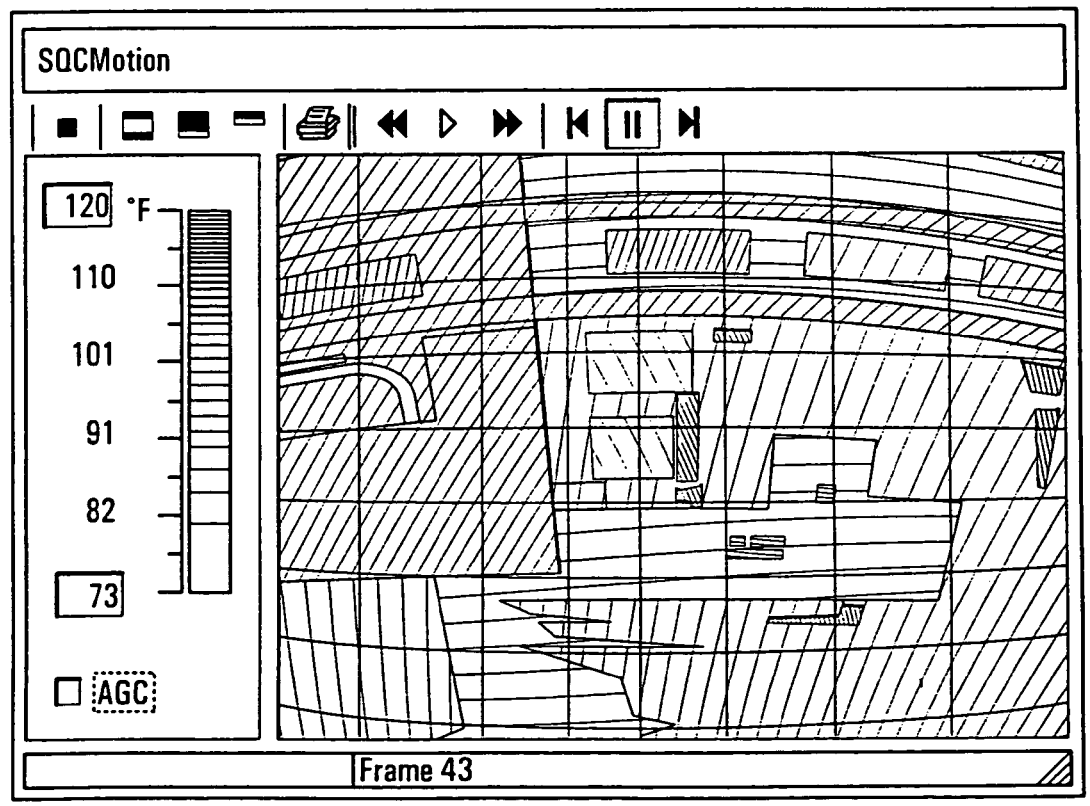
FIG. 13 is a distorted thermal image.

After the thermal imaging system 45 has determined whether the torpedo car 20 has come to a halt at the decision diamond 102, control may pass to a block 104. At the block 104, the thermal imaging system 45 may correct distortions found in the image taken by the thermal imager 46. The distorted image, as seen in FIG. 13, may be distorted due to the type of lens used on the thermal imager 46, but may be distorted for other reasons as well. The thermal imaging system 45, for example, may contain a distortion correction algorithm so that the image on the screen matches the proportions seen with the human eye, as seen in the corrected image in FIG. 12. Alternatively, in one exemplary embodiment, the thermal imaging system 45 may use a table lookup method which may be able to map input pixel locations to output pixel locations, thereby correcting the image in real time. The table may be generated when the thermal imaging system 45 determines the camera lens being used, such as a 13 mm or 25 mm lens.

For example, once the thermal imager 46 captures an image, that image is represented by a number of pixels. An image that is taken in a 320×240 resolution, for example, means that the image is made up of approximately 76800 pixels. As the image is captured, however, due to lens properties, the pixels that are located toward any end of the image become more elongated as they approach the ends (see FIG. 13). The image therefore becomes distorted, resulting in an incorrect representation of the actual occurrence. To convert the elongated or irregular pixels, the thermal imaging system 45 may contain a database or map to allow the thermal imaging system 45 to replace an irregular pixel with a predetermined regular or non-elongated pixel, thereby producing a proper thermal image and correspondingly proper thermal values (see FIG. 12).

It is worthy to note that the thermal imaging system 45 is able to convert the distorted or irregular images to corrected or regular images in real time using the database lookup method, thereby reducing the extended conversion time usually involved with other methods, such as those involving algorithms. Furthermore, the step of correcting the distortion found in the images may occur after and/or during any instant an image is captured. For example, as the images are captured in the decision diamond 102, the images may be corrected as the thermal imaging system 45 determines whether the torpedo car 20 has come to a stop. Similarly, as will be described in detail below, the images may be corrected as they are obtained between a block 106 and a decision diamond 114, or at any other instant an image is captured.

Figure 6:
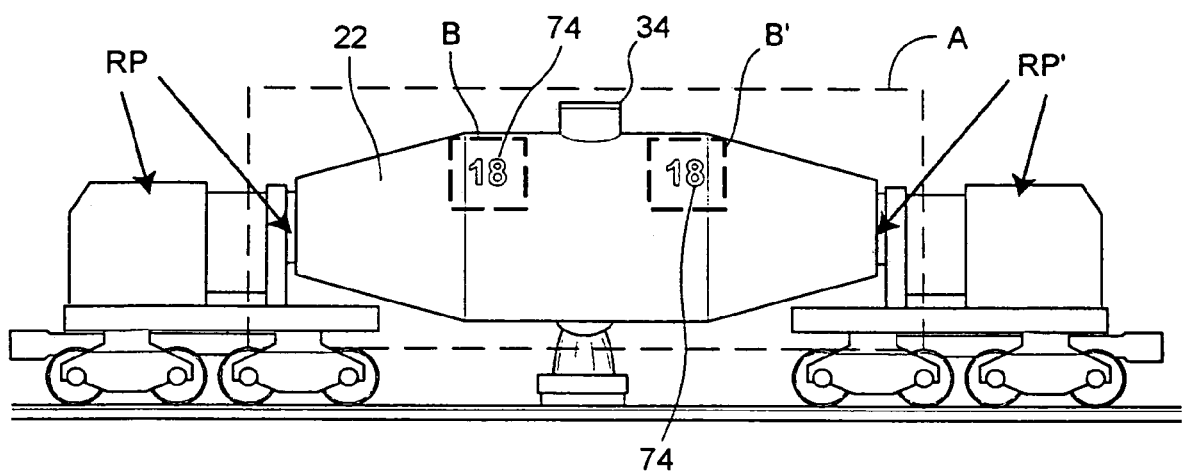
FIG. 6 is a side view of the torpedo car in the upward position, and also depicting identification numbers and perimeter lines.
Figure 8:
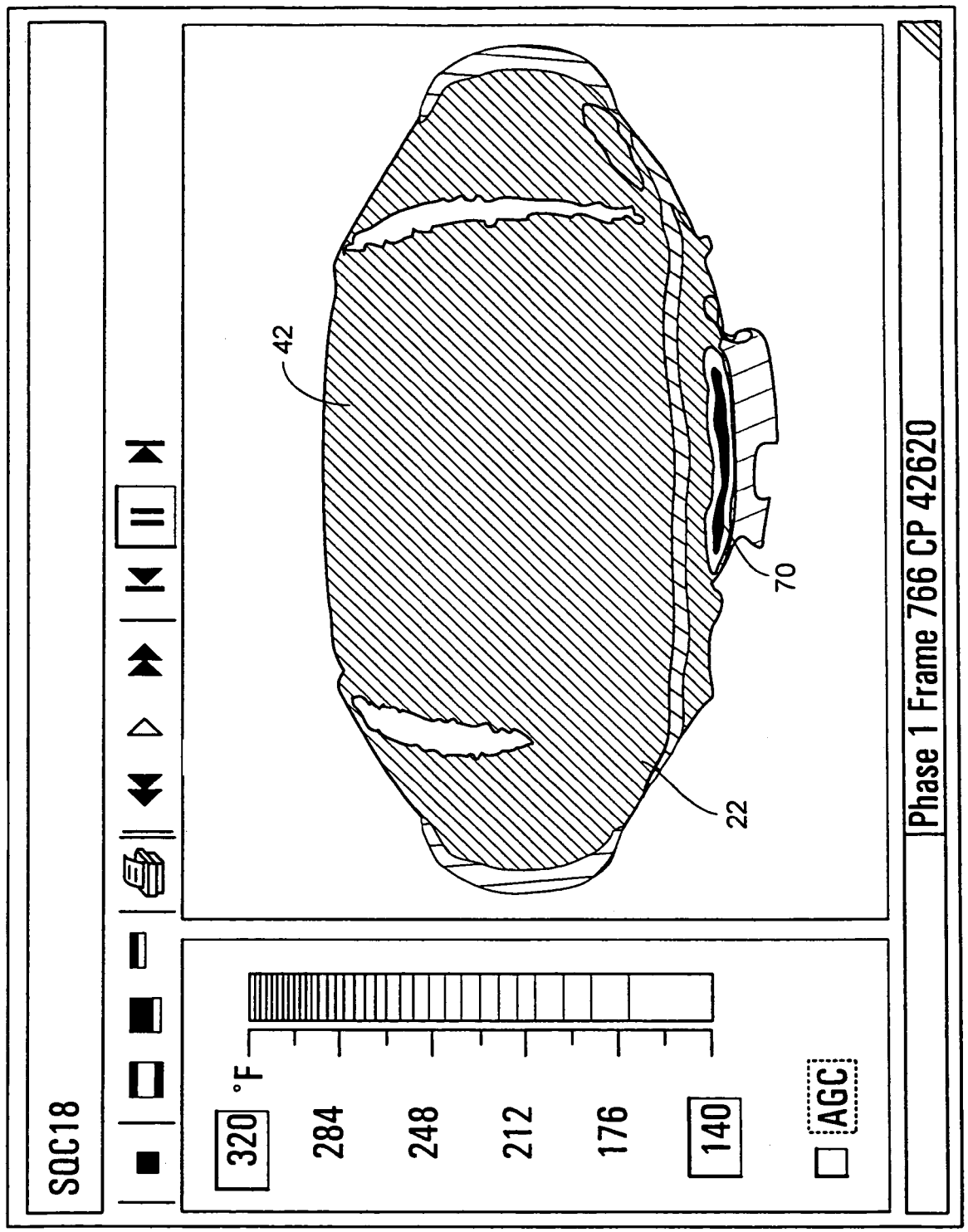
FIG. 8 is a thermal image of the side of a torpedo car in the pouring position.

In one exemplary embodiment, at a block 106, the thermal imager 46 may establish a frame of reference relative to the torpedo car 20, by determining the boundaries of the torpedo body 22. For example, when the torpedo car 20 comes to rest in front of the thermal imager 46, the exact position at which the torpedo car 20 stops may vary from one to several inches from torpedo car to torpedo car. To compensate for this variation in location, the thermal imaging system 45 may determine a more exact position of the torpedo car 20 by determining the outline of the torpedo car body 22. As best seen in FIG. 8, the thermal imaging system 45 can determine the outline of the torpedo car body 22 by realizing the temperature variation between the torpedo car body 22 and the ambient surroundings. More specifically, the temperature of the torpedo car body 22 may be approximately two hundred to three hundred degrees Fahrenheit, and the ambient surroundings may be approximately one-hundred twenty degrees Fahrenheit. By establishing the outline of the torpedo car body 22, the thermal imaging system 45 obtains a frame of reference, such that the thermal imaging system 45 can locate any part of the torpedo car body 22. For example, as shown in FIG. 6, the thermal imaging system 45 may now be able to center the torpedo car body 22 within a frame A, and be able to locate other features relative to the frame A, such as the orifice 34 or frames B and B'. Once a frame of reference has been established, control may pass to a block 108.

Figure 2:
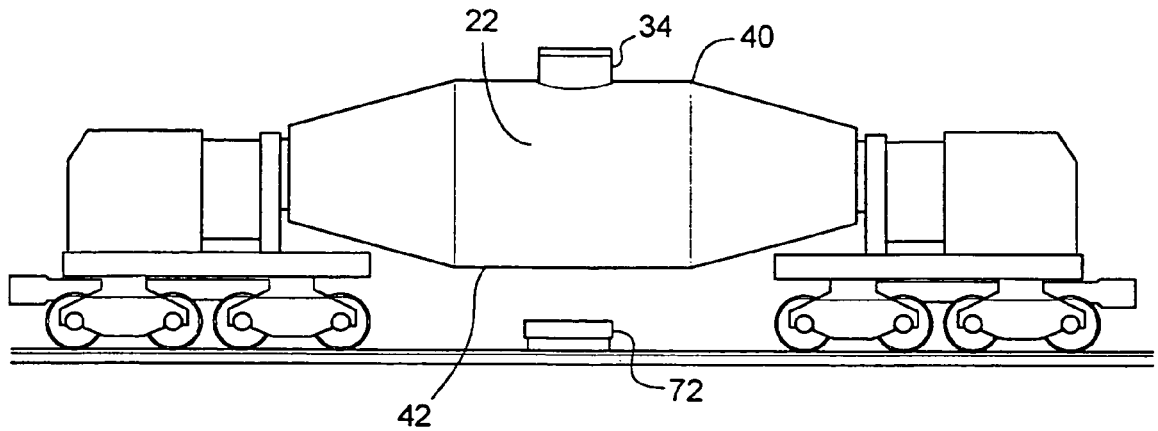
FIG. 2 is a side view of a torpedo car in an upward position.
Figure 7:
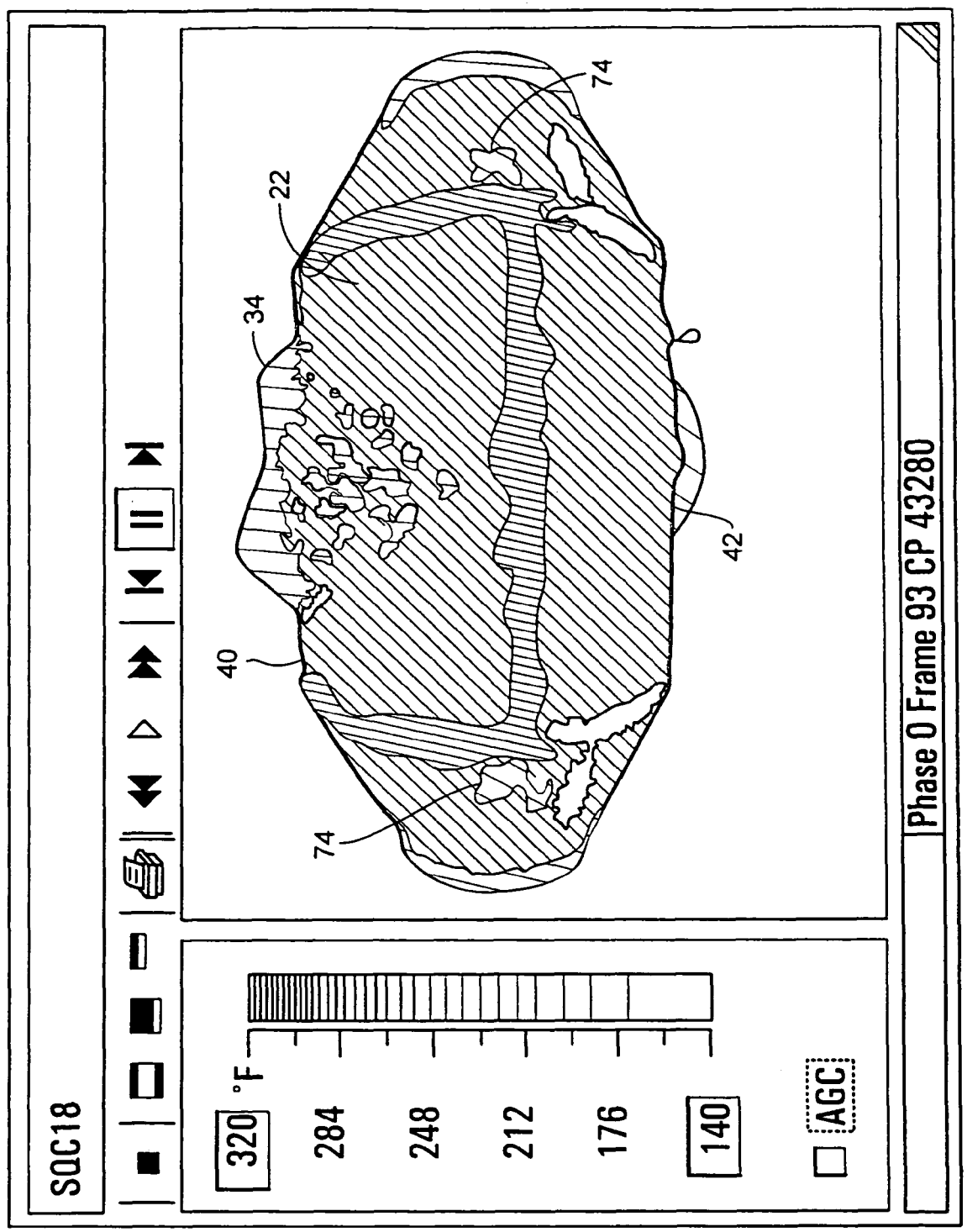
FIG. 7 is a thermal image of a side of a torpedo car in the upward position.

At the block 108, as shown in FIGS. 2 and 7, the thermal imaging system 45 may first capture images of the torpedo car 20 in the upward position, and more specifically, may capture images of the non-pouring side 44 of the torpedo car body 22 while the orifice 34 is located to the top of the torpedo car body 22.

Figure 4:
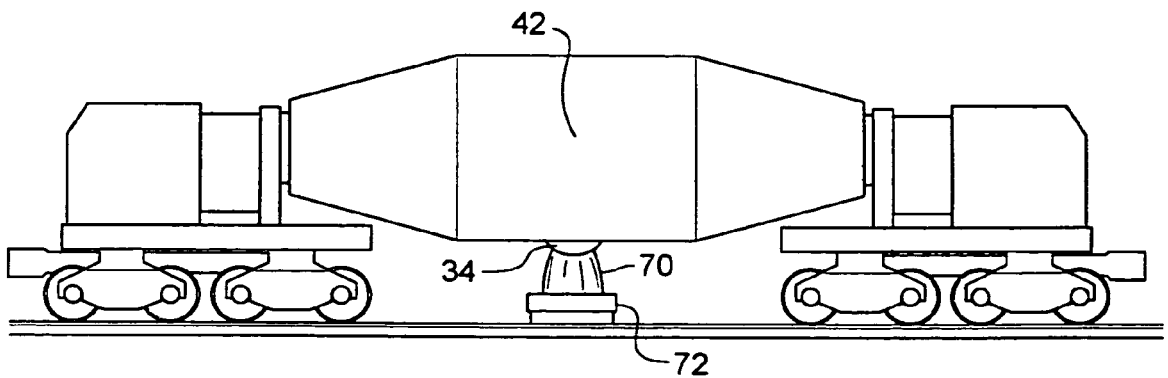
FIG. 4 is a side view of the torpedo car in a pouring position.

Once the image is captured in the block 108, the thermal imaging system 45 may determine, at a decision diamond 110, whether the image captured in the block 108 is the image that shows the torpedo body 22 in the maximum flow rate position. The thermal imaging system 45 may determine which image corresponds to the maximum flow rate position by capturing images of the pouring molten metal 70, from underneath the torpedo car body 22, and examining the pouring area of the molten metal 70. As can be seen in FIGS. 1 and 4, as the molten metal 70 runs from the orifice 34 of the torpedo car body 22, the thermal imager 46 has a field of view that includes the molten metal 70 as it exits the orifice 34.

The thermal imaging system 45, as seen in FIG. 8, may now examine the captured image taken at the block 108 and determine whether the image has the maximum amount of molten metal 70 flowing from the orifice 34. More specifically, the thermal imaging system 45 can differentiate the torpedo car body 22 (two hundred to three hundred degrees Fahrenheit) and the ambient surroundings (one-hundred twenty degrees Fahrenheit) from the molten metal 70 which may be approximately two thousand degrees Fahrenheit. The thermal imaging system 45 may determine the maximum flow rate by calculating the area of the molten metal 70 captured by the images, and/or calculating other parameters of the molten metal area, such as height, width and/or number of pixels that are representative of the molten metal flow.

If the thermal imaging system 45 determines at the decision diamond 110 that the current image contains the maximum flow rate yet taken during the pouring of the molten metal 70 from the torpedo car 20, then control may pass to a block 112. At the block 112 the thermal imaging system 45 may save the maximum flow rate image. If a previous maximum flow rate image has been saved, the thermal imaging system 45 may replace that previously saved image with a new maximum flow rate image. For example, as will be made apparent below, the thermal imaging system 45 may take a plurality of images of the torpedo car 20 as the torpedo car 20 is in the process of dispensing the molten metal 70. As the flow rate of the molten metal 70 increases, the thermal imaging system 45 will continue to capture images, some of which may contain a flow rate greater than in any previous image. The thermal imaging system 45 may, therefore, replace the earlier maximum image with the new maximum image.

At the decision diamond 110, the thermal imaging system 45 may, however, determine that the current image does not contain the maximum flow rate. For example, after the torpedo car 20 reaches the maximum pouring position as shown in FIGS. 4 and 5, the thermal imaging system 45 may no longer receive images depicting the maximum amount of flowing molten metal 70.

More specifically, the torpedo car 20 may eventually be in the maximum pouring position as shown in FIGS. 4 and 5, at which time, the torpedo car 20 may stop rotating toward the pour side 44 and the molten metal 70 may reach its maximum flow rate from the orifice 34. Once the pour is complete or the torpedo car 20 is empty, the torpedo car body 22 may rotate toward the non-pouring side, such that the orifice 34 returns to the upperside 42 of the torpedo car body 22. The images obtained after the pour is complete may not contain any indication of molten metal 70 flowing from the orifice 34, and therefore the current image may not contain a greater flow rate compared to a previously captured image.

Once the torpedo car has returned the orifice 34 to the upperside 40 of the torpedo car 20, the torpedo car 20 may thereafter begin to move.

After, at the block 112, the thermal imaging system 45 saves the maximum flow rate image, or if the thermal imaging system 45 determines, at decision diamond 110, that the image does not contain the maximum flow rate, control may pass to the decision diamond 114. At the decision diamond 114, the thermal imaging system 45 may determine whether the torpedo car 20 is still in position and has not moved.

The thermal image system 45 may know that the torpedo car 20 has begun to move by a signal received from the torpedo car sensor 50, indicating that the torpedo car 20 is moving. In an alternate exemplary embodiment, the thermal imaging system 45 may determine whether the torpedo car 20 has begun to move by programming the thermal imaging system 45 to respond to a percentage of the field of view of the thermal image.

For example, the thermal imager 46 has a field of view as can be seen in FIG. 1. As the torpedo car 20 leaves the field of view of the thermal imager 46, a percentage of the field of view will be occupied by the torpedo car 20, a percentage will be ambient surroundings, and a percentage may be miscellaneous objects. The thermal imaging system 45 may be programmed to consider the torpedo car moving, when the percentage of the field, occupied by the torpedo car, reaches below a predetermined number. More specifically, when more than fifty percent of the thermal image is occupied by a temperature below two hundred degrees Fahrenheit (a temperature that may be representative of the ambient surroundings) the thermal imaging system 45 may consider the torpedo car 20 to be moving.

If at the decision diamond 114, the thermal imaging system 45 determines that the torpedo car 20 has not moved, control may pass again to the block 106 for the thermal imaging system 45 to continue capturing images. If, however, at the decision diamond 114, the thermal imaging system 45 determines that the torpedo car 20 is moving, control may pass to a block 116.

After decision diamond 114, the block 116 may identify the particular torpedo car 20 being scanned. In one exemplary embodiment, the thermal imaging system 45 may identify the torpedo car 20 by decoding one of the thermal images as obtained in the block 108. More specifically, as shown in FIGS. 6 and 7, the torpedo car 20 may include a pair of raised numbers 74 (in this instance 18) that are located on and are integral to the torpedo car body 22. As can be seen in FIG. 7, the thermal imaging system 45 can distinguish the temperature variation between the raised numbers 74 and the remainder of the torpedo body 22, due to the lower temperature of the raised portions 74. With the use of an optical character recognition program (OCR), the thermal image obtained of the numbers 74 may now be translated into a recognizable identification means, that may be attached to the image saved at the block 112.

In an alternate exemplary embodiment, a type of thermal fingerprint is developed from each individual torpedo car 20, which may then be later used to identify any of the torpedo cars 20 that have been fingerprinted. The fingerprint may be obtained by converting individual pixel values to binomial values based on whether the value is above or below the mean. A pattern may then be matched against any stored patterns in a library for the best correlation. A pattern not meeting the matching criteria may be assumed to be a torpedo car 20 not yet fingerprinted and may be automatically added to the library and given the next sequence number.

The identification of the torpedo car 20 is, however, not limited to the two disclosed above, and may include other forms of identification, such as manual identification, identification using an RF tag and reader identification system, or any other suitable means of identifying a torpedo car 20. The means in which the torpedo car 20 is labeled, is also not limited to numeric, but may also be labeled with letters, alphanumeric, or any other from of indicia.

After the torpedo car 20 is identified, at the block 116, control may pass to a block 118. At the block 118, the thermal imaging system 45 may evaluate the image saved at the block 112 to determine whether any areas on the underside 42 of the torpedo body 22 fail for being weak or thin. The image saved at the block 112 may be the image encapsulating the maximum flow rate of the molten metal 70 from the torpedo car body 22, and more importantly, is the image encapsulating the underside 42 of the torpedo car body 22. As can be seen in FIGS. 1 and 4, the field of view of the thermal imager 46 captures both the flow of the molten metal 70 from the orifice 34 under the torpedo car body 22, and captures the underside 42 of the torpedo body 22, at the same time.

Figure 9:
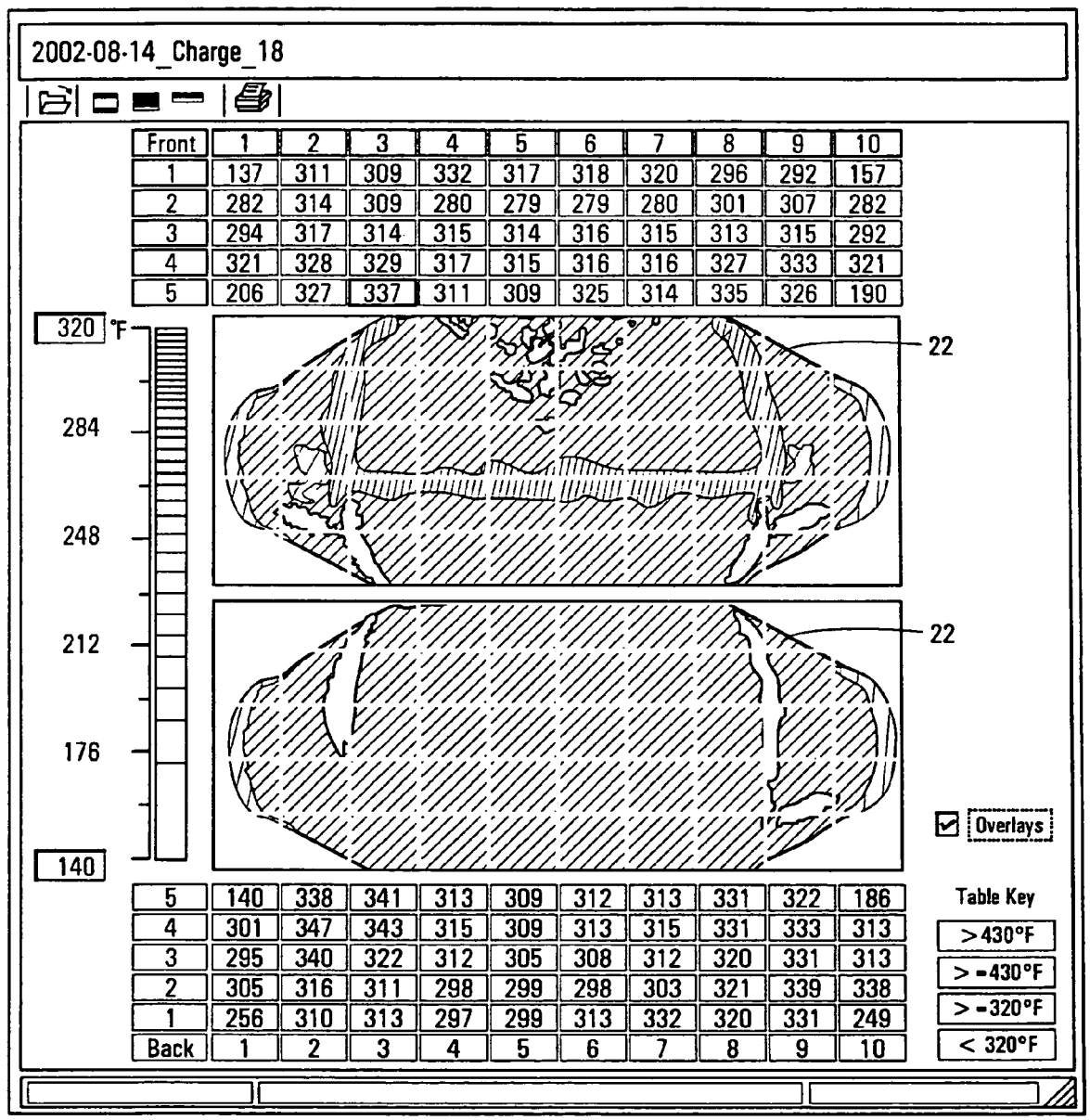
FIG. 9 is a thermal image and a corresponding temperature gradient of the side of a torpedo car in the upward position (upper image) and in the pouring position (lower image)

As can best be seen in FIG. 9, the thermal imaging system 45 is programmed to display the various temperatures of the image as captured. Above the upper image in FIG. 9, is a correlating grid of temperatures which corresponds to the grid on the upper image of FIG. 9. Similarly, there is a grid of temperatures under the lower image in FIG. 9, which corresponds to the grid on the lower image of FIG. 9. As can best be seen at coordinates 5-3 on the upper image of FIG. 9, the approximate temperature of the torpedo car body 22 at that location is three hundred thirty-three degrees Fahrenheit and is represented by a light color. If the temperature or color on the image is above a certain predetermined value the torpedo body 22 may, at a decision diamond 120, be deemed to have a weak or thin spot that may jeopardize the integrity of the torpedo car body 22.

If such a determination is made, control may pass to a block 122, where the thermal imaging system 45 may activate an alarm 64. The thermal imaging system 45 may include an alarm 64 configured to activate upon receiving, or failing to receive, a signal. As such, in one exemplary embodiment, the thermal imaging system 45 may include, as shown in FIG. 12, the alarm 64. Such alarms may be audible, visual, or tactile in nature, or may be automated so as to cease operation or take other corrective action as needed.

If, however, at the decision diamond 120 the thermal imaging system 45 determines that all the temperature values and hence the integrity of the torpedo body 22 are within the acceptable predetermined limits, the torpedo car 20 passes and the routine 100 returns to the block 102 for the thermal imaging system 45 to await for the next torpedo car 20.

In another exemplary embodiment, the temperature of the torpedo car 20 may be affected by varying factors such as ambient temperatures, humidity levels, general weather conditions such as rain or snow and wind conditions. To account for such varying factors, the temperature measured from the torpedo car 20 may go through a normalization process, such that more accurate temperature measurement of the torpedo car 20 may be obtained. For example, on day one when one or more of the varying factors increase the overall temperature of the torpedo car, the hotspot temperature measured by the thermal scanners may be approximately five-hundred fifty degrees Fahrenheit. On day two, however, when one or more of the varying factors decrease the overall temperature of the torpedo car, the hotspot temperature measured by the thermal scanners may be approximately four-hundred fifty degrees Fahrenheit. When comparing the temperature data of the hotspots of the torpedo car over the two days, the user would conclude that the hotspot on the torpedo car is decreasing in temperature as usage of the torpedo car increases. This, however, would be an incorrect conclusion, which could result in unexpected failure of the torpedo car.

Similarly, if one or more of the varying factors decreases the overall temperature of the torpedo car on day one, the hotspot temperature measured by the thermal scanners may be approximately four-hundred fifty degrees Fahrenheit. On day two, however, when one or more of the varying factors increases the overall temperature of the torpedo car, the hotspot temperature measured by the thermal scanners may be approximately five-hundred fifty degrees Fahrenheit. When comparing the temperature data of the hotspots of the torpedo car over these two days, the user would conclude that the hotspot on the torpedo car is increasing in temperature as usage of the torpedo car increases. This, however, would again be an incorrect conclusion, which could result in the removal of the torpedo car from service when in fact it is still operating within acceptable temperatures.

One exemplary embodiment of a normalization process is graphically depicted in FIG. 12, as exemplary routine 200. Once the torpedo car 20 comes to a stop at the pour location, the thermal imagers 46, 47 may start capturing images. At a decision diamond 202, the thermal imaging system 45 may determine whether the torpedo car 20 has come to a halt. The thermal imaging system 45 may know that the torpedo car 20 has come to a stop by a signal received from the torpedo car sensor 50 indicating that the torpedo car 20 has stopped. In an alternate exemplary embodiment, the thermal imaging system 45 may determine whether the torpedo car 20 has come to a stop, by programming the thermal imaging system 45 to respond to a percentage of the field of view of the thermal image as described earlier.

It should be noted at this point that the routine 200 is only one of many possible routines for sensing the temperature variations on the torpedo car 20 and that it is not the intention of the applicant to limit this disclosure to the routine 200. Furthermore, other routines may involve more or less hardware, software and/or steps than are disclosed in the routine 200. Similarly, the steps as described herein may be taken out of order, as long as the intended purpose is accomplished. For example, the thermal imaging system 45 may include more or less thermal imagers.

After the thermal imaging system 45 has determined whether the torpedo car 20 has come to a halt at the decision diamond 202, control may pass to a block 204. At the block 204, the thermal imaging system 45 may correct distortions found in the image taken by the thermal imager 46.

In one exemplary embodiment, at a block 206, the thermal imager 46 may establish a frame of reference relative to the torpedo car 20, by determining the boundaries of the torpedo body 22. For example, as shown in FIG. 6, the thermal imaging system 45 may now be able to center the torpedo car body 22 within a frame A, and be able to locate other features relative to the frame A, such as the orifice 34, frames B and B' and frames RP and RP'. Once a frame of reference has been established, control may pass to a block 208.

At the block 208, the thermal imaging system 45 may capture one or more images of the torpedo car 20 with one or more thermal imagers. More specifically, the thermal imager 46 may capture an image of the first side of the torpedo car 20, and the thermal imager 47 may capture an image of the second side of the torpedo car 20. However, as will become apparent later, the number of thermal imagers may be one or more, as long as the necessary thermal data can be obtained from the thermal image(s).

After block 208, a block 210 may identify the particular torpedo car 20 from which the images are being captured. In one exemplary embodiment, the thermal imaging system 45 may identify the torpedo car 20 by decoding one of the thermal images as obtained in the block 208. More specifically, as shown in FIG. 6, the torpedo car 20 may include a pair of raised numbers 74 (in this instance 18) that are located on and are integral to the torpedo car body 22. With the use of an optical character recognition program (OCR), the thermal image obtained of the numbers 74 may now be translated into a recognizable identification means that may be attached to the image saved at a block 220.

The identification of the torpedo car 20 is, however, not limited to the one disclosed above, and may include other forms of identification, such as manual identification, identification using an RF tag and reader identification system, or any other suitable means of identifying a torpedo car 20. The means in which the torpedo car 20 is labeled, is also not limited to numeric, but may also be labeled with letters, alphanumeric, or any other form of indicia.

After the torpedo car has been identified at the block 210, the thermal history of the torpedo car 20 may be obtained at a block 212. The thermal history of the torpedo car may be obtained from a database located on the controller 48, but may be obtained from any viable storage means. The values obtained from the thermal history of the torpedo car 20 may include thermal values representing one or more reference temperature ("RT") and a hotspot temperature ("HT") of the torpedo car 20 over a period of time.

The reference temperature of the torpedo car 20 may be a temperature on the torpedo car 20 that is less affected by the temperature of the molten metal 70 than other parts of the torpedo car 20, and/or may be a temperature on the torpedo car 20 that is more effected by other temperature varying factors such as ambient temperatures, humidity levels, general weather conditions such as rain or snow and wind conditions, than other parts of the torpedo car 20. For example, as seen in FIG. 6, the reference temperature may be obtained by measuring the temperature in or near the areas defined by Reference Point ("RP") and RP'. These areas are less affected by the temperature of the molten metal 70 and/or are more affected by other temperature varying factors, because these areas are removed enough from the molten metal to exhibit temperature variations independent of the molten metal temperature, and are close enough to be exposed to the same temperature varying factors.

The hotspot temperature of the torpedo car 20 is the highest indicated temperature on the torpedo car 20. For example, the hotspot temperature is most likely the temperature taken at the thinnest point on the torpedo car 20 that is in close proximity to the molten metal 70 called the "hotspot". Therefore, the hotspot and hence the hotspot temperature representative of the hotspot, is indicative of the longevity and current integrity of the torpedo car 20.

At a block 214 the user and/or software may obtain one or more reference temperatures of the torpedo car 20 via the captured image at the block 208. Similarly, at a block 216 the user and/or software may obtain one or more hotspot temperatures of the torpedo car 20 via the captured image at the block 208.

Once the current hotspot temperature and reference temperature is obtained from the torpedo car 20, the user and/or software can, at a block 218, use those temperature along with the temperatures obtained from the thermal history of the torpedo car 20 to calculate or normalize the torpedo car 20 temperatures.

Figure 14:
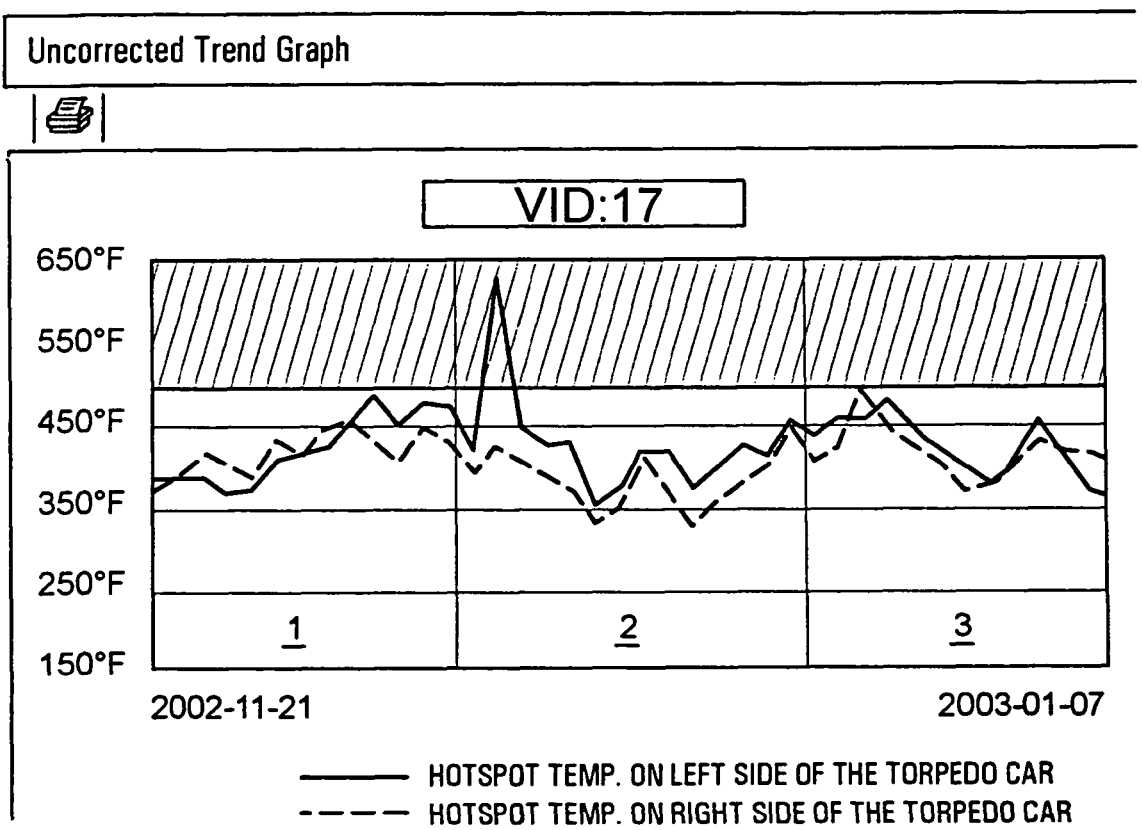
FIG. 14 is a trend graph representing uncorrected thermal values over a period of time, of a torpedo car.
Figure 15:
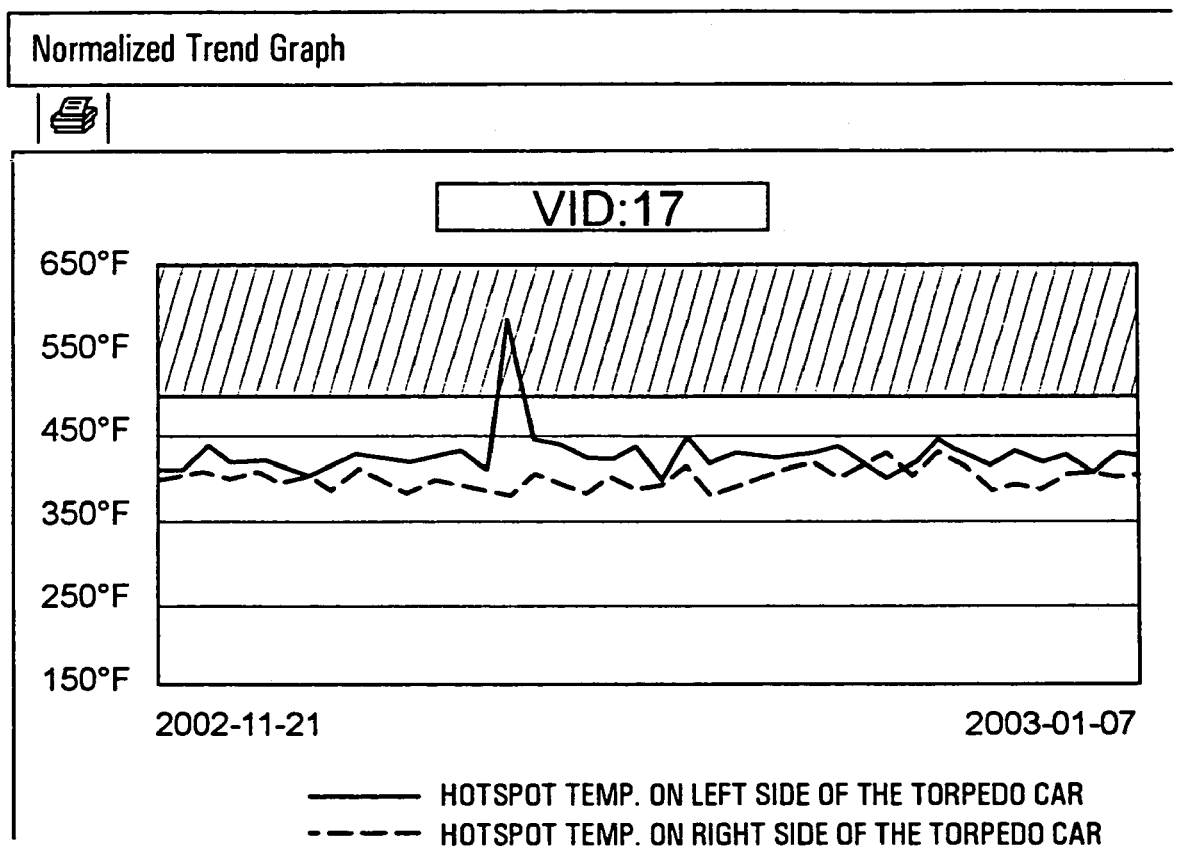
FIG. 15 is a normalized trend graph of the thermal values of FIG. 14.
Figure 16:
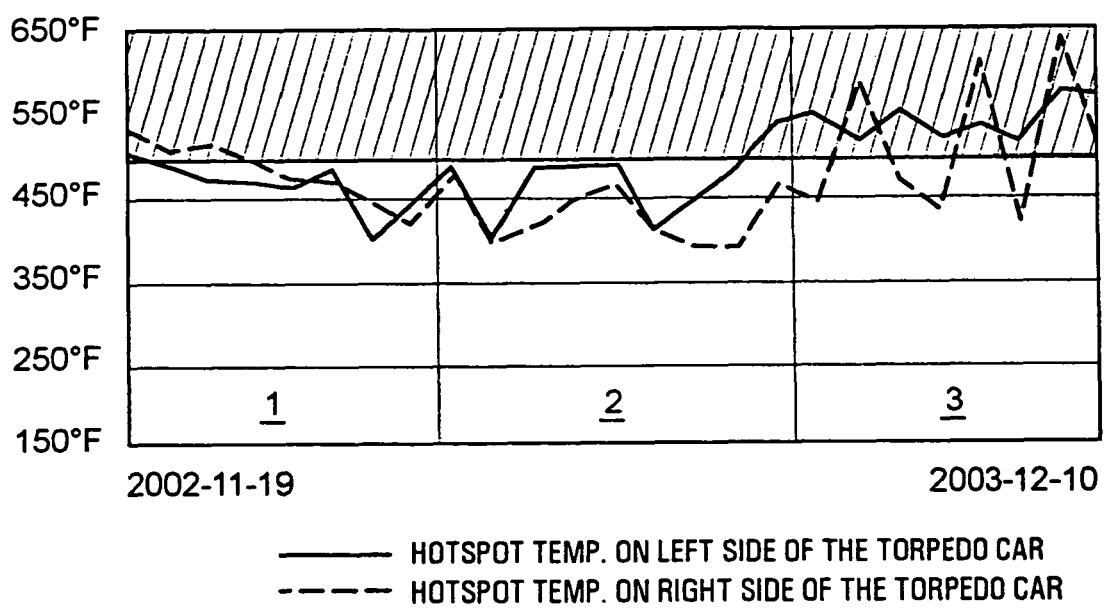
FIG. 16 is a trend graph representing uncorrected thermal values over a period of time, of a torpedo car.
Figure 17:
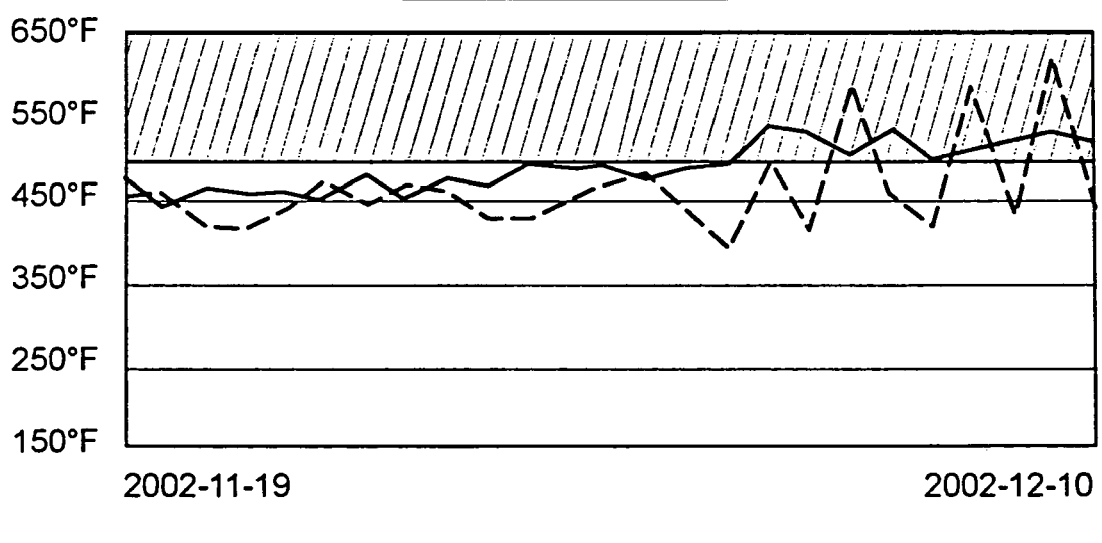
FIG. 17 is a normalized trend graph of the thermal values of FIG. 16.
Figure 18:
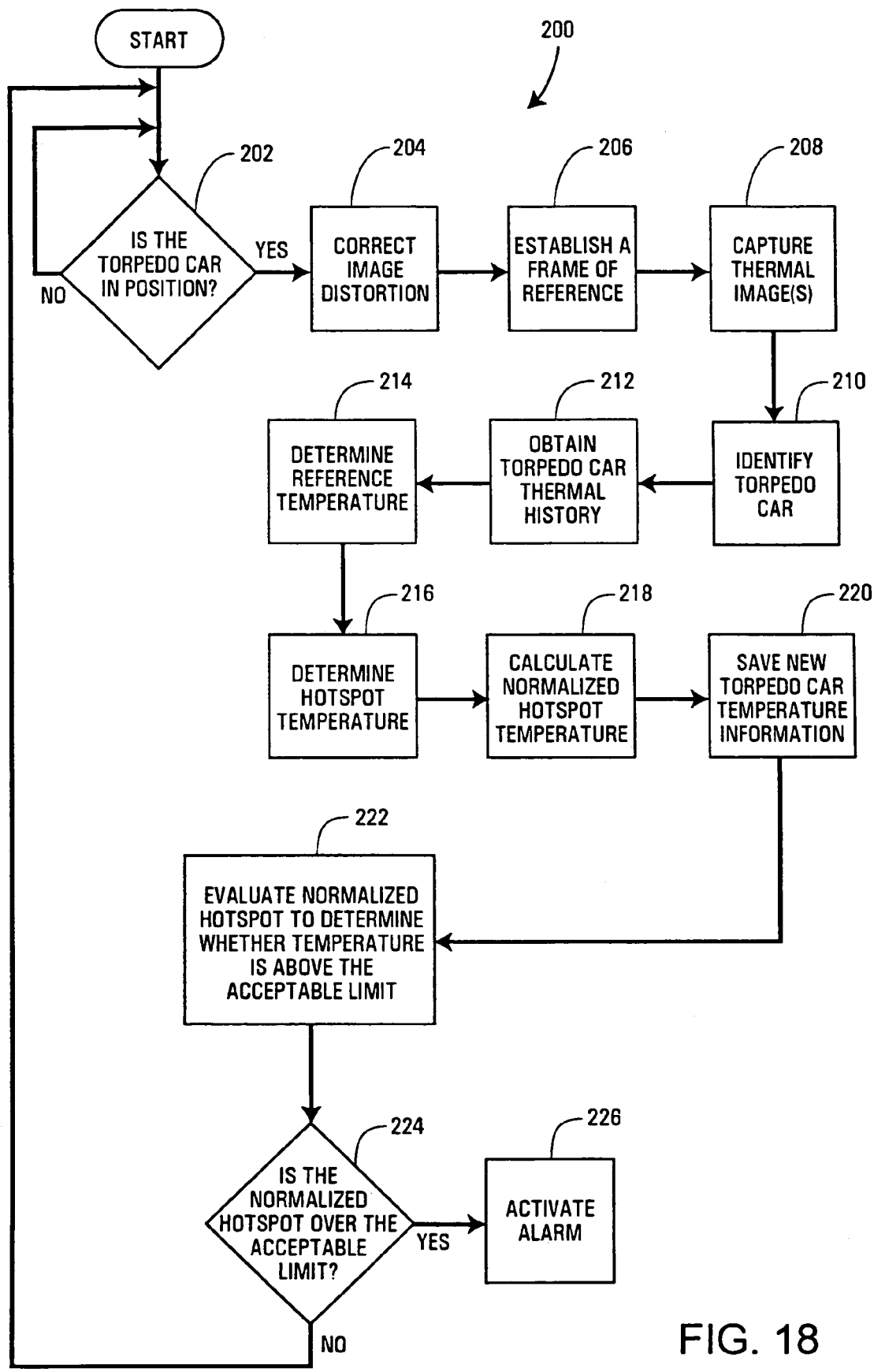
FIG. 18 is a flowchart of one embodiment of the temperature sensing method in accordance with the teachings of the disclosure.

For example, as seen in FIGS. 14 and 16, the hotspot temperatures of torpedo cars "17" and "362" vary from day to day. (FIGS. 14 and 16 are each graphical representations of uncorrected hotspot temperatures recorded from the torpedo car "17" (FIG. 14) and the torpedo car "362" (FIG. 16) over a several week period. FIGS. 15 and 17 are each graphical representations of corrected or normalized hotspot temperatures of the torpedo car "17" (FIG. 15) and the torpedo car "362" (FIG. 17).

More specifically, as seen in FIG. 14, graph section one indicates that the hotspot temperature of torpedo car "17" is increasing from approximately three-hundred fifty degrees Fahrenheit to approximately four hundred seventy-five degrees Fahrenheit. This would indicate that the torpedo car "17" is becoming weaker and its walls are getting thinner, which would hence indicate that the torpedo car "17" needs to be pulled from service if the maximum allowable hotspot temperature is five hundred degrees Fahrenheit. Once the hotspot temperature is normalized, however, (FIG. 15) it becomes obvious that the hotspot temperature of the torpedo car "17" is in fact not increasing, but is staying approximately the same at three hundred seventy-five degrees Fahrenheit.

Similarly, as seen in FIG. 16, graph section one indicates that the hotspot temperature of torpedo car "362" is decreasing from approximately five hundred degrees Fahrenheit to approximately four-hundred fifty degrees Fahrenheit. This would indicate that the torpedo car "362" is becoming stronger and its walls are getting thicker, which would hence indicated that the torpedo car "362" is becoming better with usage and should not be pulled from service. Once the hotspot temperature is normalized, however, (FIG. 17) it becomes obvious that the hotspot temperature of the torpedo car "362" is in fact not decreasing, but is increasing steadily, as would be expected.

To achieve the normalized hotspot temperature the user and/or software obtains past reference temperatures ("RT") from the torpedo car 20 and averages those temperate values ("AVRT"). By averaging the past reference temperature values, a more realistic and true reference temperature is obtained. In other words, by averaging the past reference temperatures, the temperature variants due to external factors, such as weather and ambient temperature, are removed.

The actual temperature variations ("ATV"), due to external factors, affecting the torpedo 20 can be obtained by subtracting the reference temperature (RT) from the average of the past reference temperatures ("AVRT"). The corrected or normalized hotspot temperature ("NORMHSPOT") is then obtained by adding the actual temperature variations (ATV) to the hotspot temperature (HT). These calculations can be presented as follows:

$$AVRT-RT=ATV$$

$$HT+ATV=NORMHSPOT$$

At the block 220, the temperature information may be saved to the database of the controller 48, or to any other means of storing information.

If, at block 222, the normalized hotspot temperature is above a certain predetermined value, the torpedo body 22 may, at a decision diamond 224, be deemed to have a weak or thin spot that may jeopardize the integrity of the torpedo car body 22.

If such a determination is made, control may pass to a block 226, where the thermal imaging system 45 may activate an alarm 64. The thermal imaging system 45 may include an alarm 64 configured to activate upon receiving, or failing to receive, a signal. As such, in one exemplary embodiment, the thermal imaging system 45 may include, as shown in FIG. 11, the alarm 64. Such alarms may be audible, visual, or tactile in nature, or may be automated so as to cease operation or take other corrective action as needed.

If, however, at the decision diamond 224 the thermal imaging system 45 determines that all the temperature values and hence the integrity of the torpedo body 22 are within the acceptable predetermined limits, the torpedo car 20 passes and the routine 200 returns to the block 202 for the thermal imaging system 45 to await the next torpedo car 20.

The foregoing detailed description has been given for clearness of understanding only and no unnecessary limitations should be understood therefrom, as modifications may be obvious to those skilled in the art.

What is claimed is:

1. A method of sensing the temperature of a heated object associated with a heat source and having at least a first portion and a second portion, wherein the first portion is less affected by the heat source than the second portion, comprising:
    obtaining past temperature data relating to the heated object and associated with past temperature measurements;
    capturing a thermal image of the heated object;
    obtaining a reference temperature of the heated object based on the captured thermal image, wherein the reference temperature is associated with the first portion of the heated object; and
    calculating a normalized hotspot temperature based on at least the obtained past temperature data, the captured thermal image, and the reference temperature to compensate for environmental factors associated with the heated object, wherein
    the heated object is a molten metal vehicle, and wherein the first portion of the heated object is less affected by a molten metal than the second portion of the heated object, wherein the second portion is in contact with the molten metal.

2. The method of claim 1, wherein the past temperature data includes at least one of a past hotspot temperature and a past reference temperature.

3. The method of claim 1, further including obtaining a hotspot temperature of the heated object.

4. The method of claim 3, wherein calculating the normalized hotspot temperature further includes comparing the hotspot temperature to the past temperature data.

5. The method of claim 1, wherein calculating the normalized hotspot temperature further includes comparing the reference temperature to the past temperature data.

6. The method of claim 1, wherein the heat source is not associated with the acts of capturing the thermal image of the heated object or obtaining the reference temperature of the heated object.

7. The method of claim 1, wherein obtaining past temperature data relating to the heated object includes averaging a plurality of past temperature measurements of the heated object.

8. The method of claim 1, further comprising developing a thermal fingerprint of the heated object, including:
   generating a plurality of individual pixels based on the captured thermal image;
   comparing each of the plurality of individual pixels to a threshold value; and
   generating a binary value for each of the plurality of individual pixels according to whether the pixel is above or below the threshold value.

9. A system for sensing the temperature of a heated object, comprising:
   at least one thermal imager;
   a memory storing past temperature data associated with the heated object; and
   a controller communicably coupled to the thermal imager and to the memory, the controller being adapted to receive thermal image data associated with the heated object from the thermal imager and the past temperature data from the memory, obtain current temperature data from the thermal image, and calculate a normalized hotspot temperature from the current temperature data and the past temperature data to compensate for environmental factors associated with the heated object, wherein
   the past temperature data includes at least one of a past hotspot temperature and a past reference temperature, and wherein
   the past reference temperature is obtained from a portion of the heated object less affected by a molten metal than a portion of the heated object that is in contact with the molten metal.

10. The system of claim 9, wherein the controller is programmed to calculate the normalized hotspot temperature by comparing the past hotspot temperature and the past reference temperature to the current temperature data.

11. A system for sensing the temperature of a heated object, comprising:
   at least one thermal imager;
   a memory storing past temperature data associated with the heated object; and
   a controller communicably coupled to the thermal imager and to the memory, the controller being adapted to receive thermal image data associated with the heated object from the thermal imager and the past temperature data from the memory, obtain current temperature data from the thermal image, and calculate a normalized hotspot temperature from the current temperature data and the past temperature data to compensate for environmental factors associated with the heated object, wherein
   the current temperature data includes at least one of a hotspot temperature and a reference temperature, and wherein
   the reference temperature is obtained from a portion of the heated object less affected by a molten metal than a portion of the heated object that is in contact with the molten metal.

12. The system of claim 11, wherein the controller is programmed to calculate the normalized hotspot temperature by comparing the hotspot temperature and the reference temperature to the past temperature data.

* * * * *